United States Patent
Davis

(10) Patent No.: US 8,876,326 B1
(45) Date of Patent: Nov. 4, 2014

(54) MULTI-MODE LED EDGE-LIGHT FOR NVIS COMPATIBLE OPERATION

(75) Inventor: Joshua V. Davis, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 461 days.

(21) Appl. No.: 13/227,660

(22) Filed: Sep. 8, 2011

(51) Int. Cl.
*F21V 9/08* (2006.01)

(52) U.S. Cl.
USPC .......................................................... 362/231

(58) Field of Classification Search
USPC .......................................................... 362/231
See application file for complete search history.

(56) References Cited

U.S. PATENT DOCUMENTS

| | | | |
|---|---|---|---|
| 6,789,921 B1 * | 9/2004 | Deloy et al. ................. | 362/97.3 |
| 2005/0094391 A1 * | 5/2005 | Campbell et al. ............ | 362/231 |

\* cited by examiner

*Primary Examiner* — Anh Mai
*Assistant Examiner* — Brenitra M Lee
(74) *Attorney, Agent, or Firm* — Donna P. Suchy; Daniel M. Barbieri

(57) ABSTRACT

A night vision compatible edge-light is disclosed. The edge-light may include high efficiency white LEDs alternated with filtered multi-die or compact clustered color LEDs to provide a dual-mode configuration. For example, the filtered color LED modules may be energized in order to provide a night vision compatible mode of operation. That is, the filtered color LED modules may provide illumination so that the display is not only visible to unaided eyes, but also compatible with night vision equipment (e.g., night vision goggles) without adversely affecting the operation of the night vision equipment. On the other hand, the unfiltered white LED modules may be energized to provide illumination suitable for relatively bright operation conditions (e.g., in daylight or when sufficient ambient lights are available). Furthermore, both the white LEDs and the color LEDs may be energized simultaneously to enhance the day mode if so desired.

20 Claims, 3 Drawing Sheets

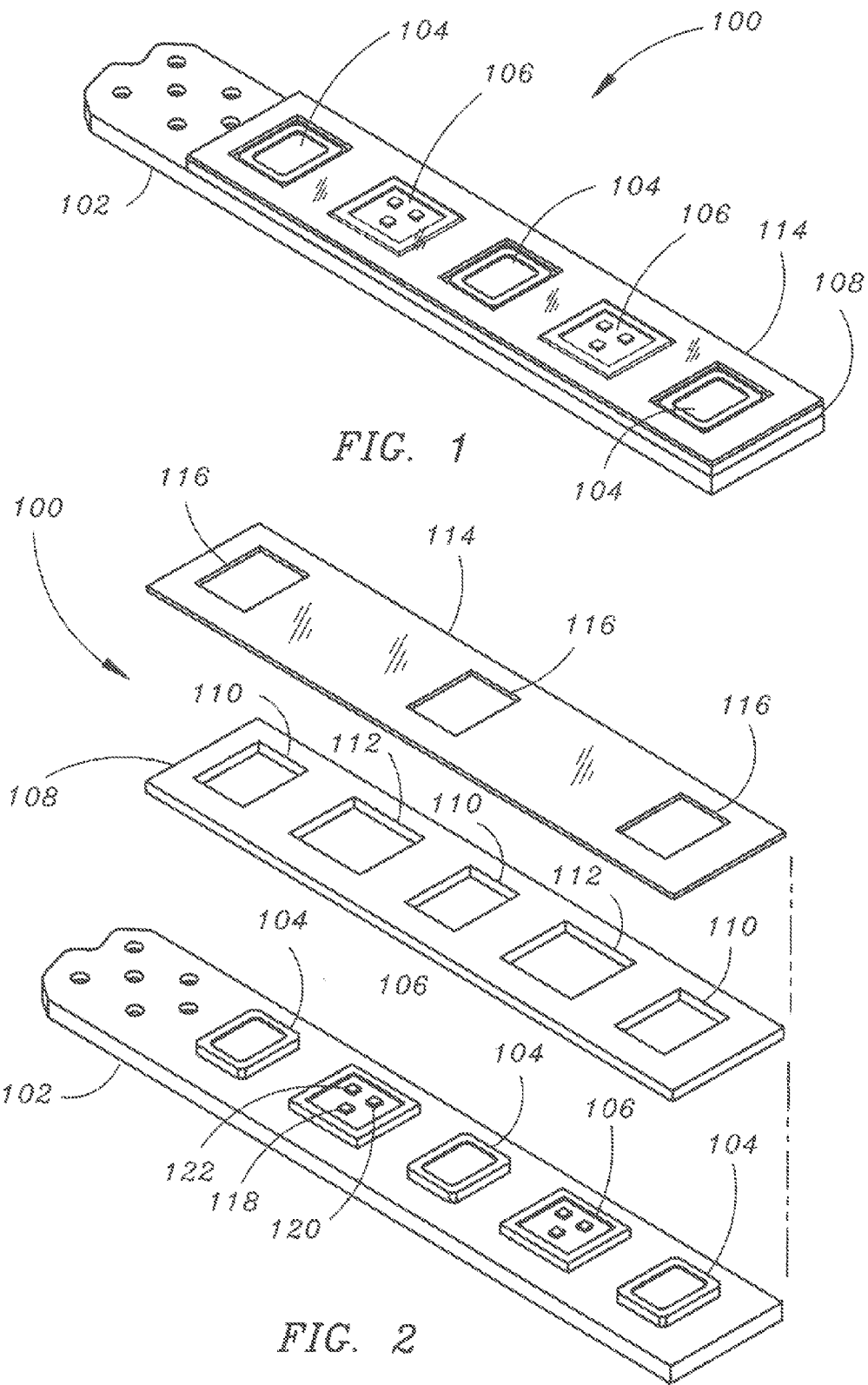

MULTI-MODE LED EDGE-LIGHT FOR NVIS COMPATIBLE OPERATION

TECHNICAL FIELD

The present disclosure relates generally to display systems and more particularly to a night vision compatible edge-light for illuminating such display systems.

BACKGROUND

Certain flat panel displays such as liquid crystal displays and the like do not produce light themselves. Illumination (ambient light or a special light source) is therefore needed in order to produce visible images for such a display. Edge-lighting is a form of illumination used in displays including liquid crystal displays (LCDs), active matrix liquid crystal displays (AMLCDs) or the like. For an edge-lit display, light sources may be arranged along the edges of the display panel and may illuminate the center and other areas of the screen using light guides. Light-emitting diodes (LEDs) may be used for providing edge-lighting for such displays.

The displays used in some applications may be required to be compatible with night vision imaging systems (NVIS). For instance, certain avionics and/or ground vehicle displays not only need to be visible to unaided eyes, but also need to be compatible with night vision equipment (e.g., night vision goggles) without adversely affecting the operation of the night vision equipment. Traditional NVIS compatible LED edge-lights are typically single mode in operation with all of the LEDs being filtered by complex and expensive thin film filters. These single mode edge-lights are limited by luminance loss as well as color uniformity issues due to the filtering variance of the emitters over angle through the thin film filters. Other NVIS compatible edge-light approaches have exhibited problems such as extreme color variations or luminance non-uniformities. Therein lies a need for a night vision compatible LED edge-light that overcomes these shortcomings.

SUMMARY

The present disclosure is directed to a night vision compatible edge-light. The edge-light may include a support base and a spacer substrate positioned on a surface of the support base. The spacer substrate defines a first set of openings and a second set of openings, the first set of openings and the second set of openings being linearly distributed along the support base. The edge-light further includes a set of white light-emitting diode (LED) modules electronically connected to the support base through the first set of openings and a set of color LED modules electronically connected to the support base through the second set of openings. An infrared filter film is positioned on the surface of the spacer substrate for providing infrared filtering for the set of color LED modules while allowing light emitted by the set of white LED modules to go through unfiltered. In this manner, the set of white LED modules and the set of color LED modules may be selectively energized to provide: a first operation mode (may also be referred to as the day mode) where the set of white LEDs are energized, and a second operation mode (may also be referred to as the night vision compatible mode) where only the set of color LEDs are energized.

A further embodiment of the present disclosure is directed to a night vision compatible edge-light. The edge-light may include: a support base, an array of white light-emitting diode (LED) modules linearly distributed on a surface of the support base, an array of color LED modules linearly distributed on the surface of the support base, and a plurality of filters configured for providing infrared filtering for the array of color LED modules. The array of white LED modules and the array of color LED modules may be selectively energized for providing: a first operation mode where the set of white LEDs are energized, and a second operation mode where only the set of color LEDs are energized.

An additional embodiment of the present disclosure is directed to a method for providing edge-lighting. The method may include: providing a linearly distributed array of white light-emitting diode (LED) modules; providing a linearly distributed array of infrared filtered color LED modules; and selectively energizing at least one of the array of white LED modules and the array of color LED modules for providing: a first operation mode where the array of white LED modules are energized, and a second operation mode where only the array of color LED modules are energized.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which:

FIG. 1 is a partial isometric view illustrating an edge-light in accordance with the present disclosure;

FIG. 2 is an exploded view of the edge-light shown in FIG. 1;

DETAILED DESCRIPTION

Figure 3:
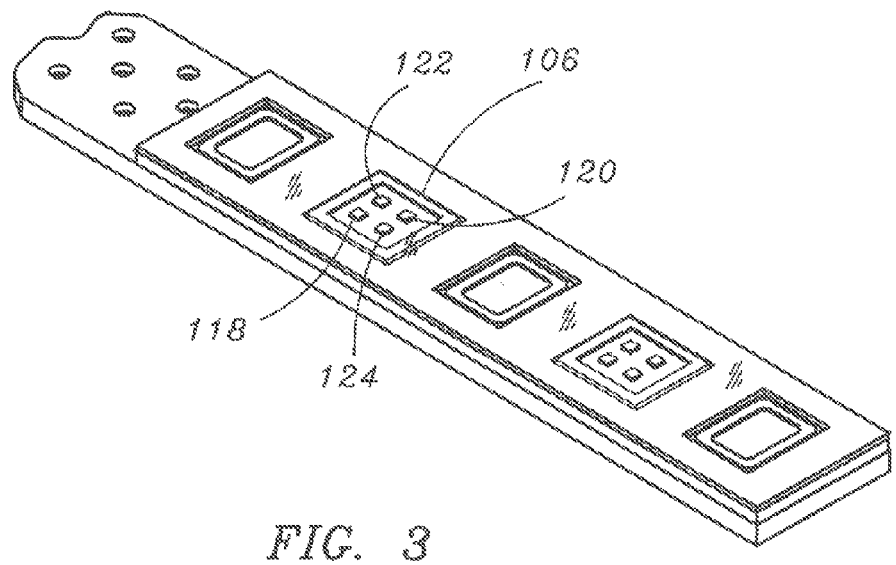
FIG. 3 is a partial isometric view illustrating another edge-light in accordance with the present disclosure.

Reference will now be made in detail to exemplary embodiments of the disclosure, examples of which are illustrated in the accompanying drawings.

The present disclosure is directed to a night vision compatible edge-light. The edge-light may include high efficiency white LEDs alternated with filtered multi-die or compact clustered color LEDs to provide a dual-mode configuration. That is, only the filtered color LEDs may be energized in order to provide a night vision goggle (NVG) compatible mode of operation. On the other hand, the unfiltered white LEDs may be energized to illuminate the display efficiently providing optimal daylight-compatible brightness without the spectral filtering hindrance of the NVG compatible mode (this mode of operation may be referred to as the day mode). Furthermore, both the white LEDs and the color LEDs may be energized simultaneously to enhance the day mode color space performance if so desired.

Referring generally to FIGS. 1 and 2. FIG. 1 is a partial isometric view depicting a night vision compatible edge-light 100 in accordance with the present disclosure and FIG. 2 is an exploded view of the edge-light 100 as shown in FIG. 1. The edge-light 100 may include a support base 102 for supporting and providing electrical connections for various LED modules 104 and 106 installed thereof. For instance, the support base 102 may include a metal core circuit board, a printed circuit board (rigid or flexible) or the like for providing electrical power as well as control information to the LED modules.

The edge-light 100 may also include a spacer substrate 108 positioned on a surface of the support base 100. The spacer substrate 108 may define a plurality of openings linearly distributed along the support base 102. In one embodiment, the plurality of openings may include a first set of openings 110 and a second set of openings 112 alternately distributed and form a single file along the support base 102 as shown in FIG. 2. In this manner, a set (array) of white LED modules 104 may be electronically connected to the support base 102 through the first set of openings 110 and a set (array) of color LED modules 106 may be electronically connected to the support base 102 through the second set of openings 112.

The height of the spacer substrate 108 may be equal to or greater than the height of the LED modules 104 and 106, therefore providing an elevated and generally uniform surface for additional layers/substrates that may need to be placed on top (with respect to the orientation as illustrated in FIGS. 1 and 2) of the spacer substrate 108. In addition, the spacer substrate 108 may be opaque and may absorb and/or prevent light leaks from the LED modules contained within. Furthermore, it is contemplated that the size of the openings provided on the spacer substrate 108 may be determined based on the physical size of the LED modules. For instance, if the physical size of a white LED module 104 is different from the physical size of a color LED module 106, then their corresponding openings, 110 and 112 respectively, may differ in sizes. On the other hand, if the white LED module 104 and the color LED module 106 have the same physical size, then their corresponding openings may also be the same.

The edge-light 100 further includes an infrared filter film 114 positioned on top of the space substrate 108. The infrared filter film 114 provides infrared filtering for the set of color LED modules 106 but does not filter the set of white LED modules 104. For instance, the infrared filter film 114 may define a set of apertures 116 that generally coincide with the locations of the first set of openings 110. In this manner, selectively activating/energizing the white LED modules 104 or the color LED modules 106 may provide different mode of operations. For example, the filtered color LED modules 106 may be energized in order to provide a night vision compatible mode of operation. That is, the filtered color LED modules may provide illumination so that the display is not only visible to unaided eyes, but also compatible with night vision equipment (e.g., night vision goggles) without adversely affecting the operation of the night vision equipment. On the other hand, the unfiltered white LED modules 104 may be energized to provide illumination suitable for relatively bright operation conditions (e.g., in daylight or when sufficient ambient lights are available).

The dual mode configuration in accordance with the present disclosure is capable of delivering good localized edge uniformity while addressing the broader color shift and uniformity artifacts associated with thin film filtering technologies. More specifically, the color LED modules may provide the spectral output capabilities to overcome the mode to mode color difference typically created by absorptive filters. In addition, the unfiltered white LED modules may boost output substantially in the absence of transmission losses normally incurred with single mode filtering. Furthermore, both the white LED modules and the color LED modules may be energized simultaneously to enhance the day mode if so desired.

It is contemplated that each LED module may include one or more individual LEDs. For example, each white LED module 104 may include one high efficiency single die white LED, multiple autonomously packaged white light LEDs, or a singular white LED component with internal multi-die structure. In addition, each color LED module 106 may include multiple discrete emitters of varying color including, but not limited to, red, green, blue, yellow or white emitters. The color LED module 106 may include either closely spaced discrete component groupings or they may be comprised of multiple discrete emitter die hosted within an integrated singular physical component package. Either variant of multi-color LED assembly would retain independent electrical drive capability for any of its individual color emitter die. In one embodiment, the color LED module 106 may be implemented as a multi-die RGB LED that includes at least one red LED 118, one green LED 120 and one blue LED 122. Alternatively, the color LED module 106 may be implemented as a compact clustered color LEDs. It is also contemplated that each color LED module 106 may further include a white LED 124 as illustrated in FIG. 3, forming a RGB+W LED configuration for each color LED module 106.

It is further contemplated that various infrared filter technologies may be utilized to form the infrared filter film 114. For instance, absorptive filter materials such as polymeric or glass-based infrared filters may be utilized for filtering the color LED modules 106. Alternatively, dichroic filters or thin film deposition techniques may also be utilized for filtering the color LED modules 106. Furthermore, other infrared filter technologies may be utilized without departing from the spirit and scope of the present disclosure. For instance, the absorptive polymeric filters may provisionally have thin film surface treatments for enhanced performance. In another example, a hybrid absorptive/dichroic approach that adds infrared filter capability to a plain polymeric film or an already IR absorptive film may provide glass or polymer based filter materials suitable for forming the infrared filter film 114.

Figure 4:
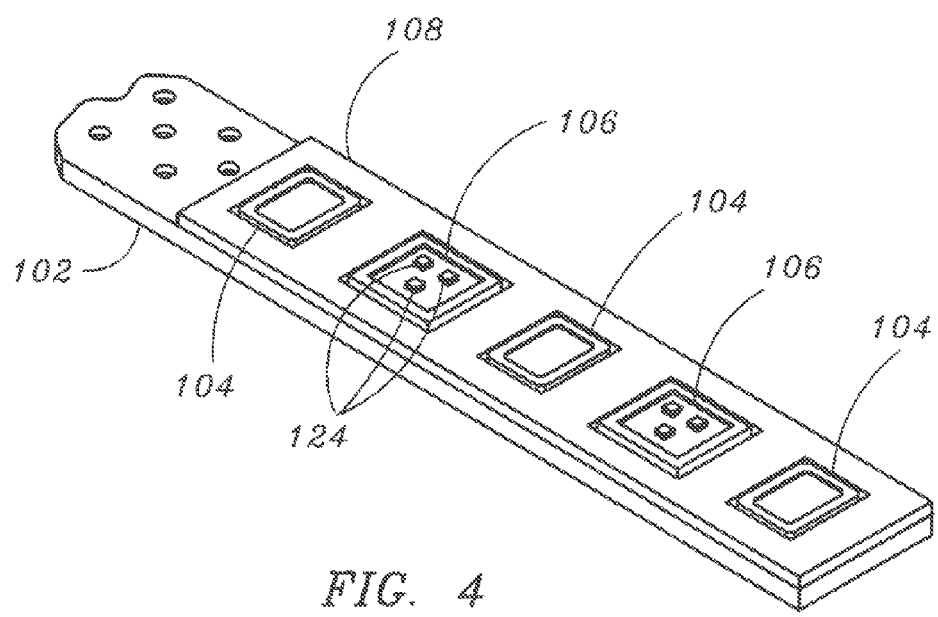
FIG. 4 is a partial isometric view illustrating still another edge-light in accordance with the present disclosure.

In an alternatively embodiment as shown in FIG. 4, instead of utilizing a continuous sheet of infrared filter film 114 as described above, smaller infrared filters may be utilized. In one example, filters may be associated with each individual LED components 124 of the color LED modules 106. That is, infrared filtering materials may be deposited on each red, green and blue LEDs. In another example, each color LED module 106 may be covered by a dedicated filter. That is, the LED components included in a color LED module 106 may be covered as a group. In either case (whether filtering is provided at the individual LED component level or at the LED module/group level), the infrared filters are capable of providing similar effects as the embodiments previously described while reducing the total amount of filtering materials that may be required. It is contemplated that placement of the filtering materials is not limited by the examples described above, as long as the placement allows the white LED modules 104 to emit unfiltered light while providing infrared filtering for light emitted by the color LED modules 106. It is also contemplated that the space substrate 108 may be optional in such implementations, as the smaller infrared filters may not require an elevated surface for installation.

The night vision compatible edge-light in accordance with the present disclosure may be utilized for edge-lighting of a lightplate for the purpose of backlighting a display such as avionics and ground vehicle displays, monitors, handheld display devices or the like. In addition, the edge-light may also be appreciated in other areas of application including, but not limited to, illuminated control panels, electronic signage or the like that may require night vision compatibilities.

Figure 5:
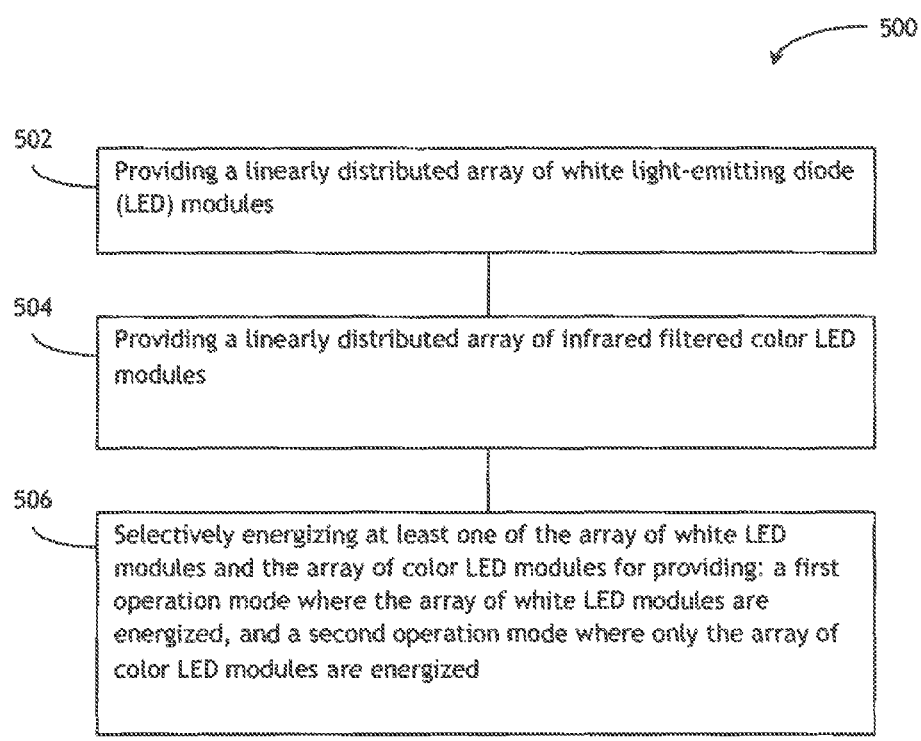
FIG. 5 is a flow chart illustrating a method for providing edge-lighting in accordance with the present disclosure.

Referring now to FIG. 5, a method 500 for providing night vision compatible edge-lighting is shown. Step 502 may provide a linearly distributed array of white LED modules and step 504 may provide a linearly distributed array of infrared filtered color LED modules, as described above. Step 506 may selectively energize the array of white LED modules or the array of color LED modules to provide the desired operation mode. For instance, in a first operation mode, the white LED modules may be energized to provide illumination suitable for relatively bright operation conditions (e.g., in daylight or with sufficient ambient lights). On the other hand, the filtered color LED modules may be energized in order to provide a second operation mode that is night vision compatible. The filtered color LED modules may provide illumination so that the display is not only visible to unaided eyes, but also compatible with night vision equipment (e.g., night vision goggles) without adversely affecting the operation of the night vision equipment.

It is understood that the present disclosure is not limited to any underlying implementing technology. The present disclosure may be implemented utilizing any combination of software and hardware technology. The present disclosure may be implemented using a variety of technologies without departing from the scope and spirit of the disclosure or without sacrificing all of its material advantages.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

It is believed that the present disclosure and many of its attendant advantages will be understood by the foregoing description, and it will be apparent that various changes may be made in the form, construction, and arrangement of the components thereof without departing from the scope and spirit of the disclosure or without sacrificing all of its material advantages. The form herein before described being merely an explanatory embodiment thereof, it is the intention of the following claims to encompass and include such changes.

What is claimed is:

1. A night vision compatible edge-light, comprising:
   a support base;
   a spacer substrate positioned on a surface of the support base, the spacer substrate defining a first set of openings and a second set of openings, the first set of openings and the second set of openings being linearly distributed along the support base;
   a set of white light-emitting diode (LED) modules electronically connected to the support base through the first set of openings;
   a set of color LED modules electronically connected to the support base through the second set of openings; and
   an infrared filter film positioned on a surface of the spacer substrate for providing infrared filtering for the set of color LED modules, the infrared filter film further defining a set of apertures generally coinciding with the first set of openings to avoid filtering the set of white LED modules,
   wherein the set of white LED modules and the set of color LED modules are selectively energized for providing:
      a first operation mode where the set of white LEDs are energized to emit unfiltered light, and
      a second operation mode where only the set of color LEDs are energized.

2. The night vision compatible edge-light of claim 1, wherein the set of white LED modules and the set of color LED modules are both energized in the first operation mode.

3. The night vision compatible edge-light of claim 1, wherein the white LED modules and the color LED modules are alternately distributed and form a single file along the support base.

4. The night vision compatible edge-light of claim 1, wherein each one of the set of color LED modules comprises a red LED, a green LED and a blue LED.

5. The night vision compatible edge-light of claim 4, wherein each one of the set of color LED modules further comprises a white LED.

6. The night vision compatible edge-light of claim 1, wherein each one of the set of color LED modules comprises a compact clustered color LED group.

7. The night vision compatible edge-light of claim 1, wherein the infrared filter film comprises at least one of: a polymeric infrared filter or a dichroic filter.

8. The night vision compatible edge-light of claim 1, wherein the support base comprises a printed circuit board for providing electricity and control signals to the set of white LED modules and the set of color LED modules.

9. A night vision compatible edge-light, comprising:
   a support base;
   a spacer substrate positioned on a surface of the support base, the spacer substrate defining a first set of openings and a second set of openings, the first set of openings and the second set of openings being linearly distributed along the support base;
   an array of white light-emitting diode (LED) modules linearly distributed on the surface of the support base, the array of white LED modules corresponding to the first set of openings;
   an array of color LED modules linearly distributed on the surface of the support base, the array of color LED modules corresponding to the second set of openings; and
   an infrared filter film positioned on a surface of the spacer substrate for providing infrared filtering for the array of color LED modules, the infrared filter film further defining a set of apertures generally coinciding with the first set of openings to avoid filtering the array of white LED modules,
   wherein the array of white LED modules and the array of color LED modules are selectively energized for providing:
      a first operation mode where the array of white LED modules are energized to emit unfiltered light, and
      a second operation mode where only the array of color LED modules are energized.

10. The night vision compatible edge-light of claim 9, wherein the array of white LED modules and the array of color LED modules are both energized in the first operation mode.

11. The night vision compatible edge-light of claim 9, wherein the array of white LED modules and the array of color LED modules are alternately distributed and form a single file along the support base.

12. The night vision compatible edge-light of claim 9, wherein each one of the array of color LED modules includes a plurality of LEDs, and each individual LED of the plurality of LEDs is associated with one of the plurality of filters.

13. The night vision compatible edge-light of claim 12, wherein each one of the set of color LED modules comprises a red LED, a green LED and a blue LED.

14. The night vision compatible edge-light of claim 13, wherein each one of the set of color LED modules further comprises a white LED.

15. The night vision compatible edge-light of claim 9, wherein each one of the plurality of filters comprises at least one of: a polymeric infrared filter or a dichroic filter.

16. The night vision compatible edge-light of claim 9, wherein the support base comprises a printed circuit board for providing electricity and control signals to the set of white LED modules and the set of multi-die LED modules.

17. A method for providing night vision compatible edge-lighting, the method comprising:
- providing a linearly distributed array of white light-emitting diode (LED) modules on a surface of a support base;
- providing a linearly distributed array of color LED modules on the surface of the support base;
- providing a spacer substrate on the surface of the support base, the spacer substrate defining a first set of openings and a second set of openings, the first set of openings corresponding to the array of white LED modules and the second set of openings corresponding to the array of color LED modules;
- providing an infrared filter film for filtering the array of color LED modules, the infrared filter film further defining a set of apertures generally coinciding with the first set of openings to avoid filtering the array of white LED modules, and
- allowing at least one of the array of white LED modules and the array of color LED modules to be selectively energized for providing:
    - a first operation mode where the array of white LED modules are energized to emit unfiltered light, and
    - a second operation mode where only the array of color LED modules are energized.

18. The method of claim 17, wherein the array of white LED modules and the array of color LED modules are both energized in the first operation mode.

19. The method of claim 17, wherein the array of white LED modules and the array of color LED modules are alternately distributed and form a single file.

20. The method of claim 17, wherein the color LED modules are filtered utilizing at least one of: a polymeric infrared filter or a dichroic filter.

* * * * *